(12) United States Patent
Florent

(10) Patent No.: US 11,055,529 B2
(45) Date of Patent: Jul. 6, 2021

(54) OPTICAL AUTHENTICATION METHOD

(71) Applicant: Jean-Jacques Florent, Annecy (FR)

(72) Inventor: Jean-Jacques Florent, Annecy (FR)

( * ) Notice: Subject to any disclaimer, the term of this patent is extended or adjusted under 35 U.S.C. 154(b) by 16 days.

(21) Appl. No.: 16/628,756

(22) PCT Filed: Jul. 19, 2018

(86) PCT No.: PCT/FR2018/051838
§ 371 (c)(1),
(2) Date: Jan. 6, 2020

(87) PCT Pub. No.: WO2019/016475
PCT Pub. Date: Jan. 24, 2019

(65) Prior Publication Data
US 2020/0143161 A1    May 7, 2020

(30) Foreign Application Priority Data
Jul. 21, 2017 (FR) ...................... 1756908

(51) Int. Cl.
G06K 9/00 (2006.01)
G06F 16/583 (2019.01)
G06K 9/62 (2006.01)

(52) U.S. Cl.
CPC ..... *G06K 9/00577* (2013.01); *G06F 16/5854* (2019.01); *G06K 9/6201* (2013.01); *G06K 2009/0059* (2013.01)

(58) Field of Classification Search
CPC ............ H04N 21/4666; H04N 21/4667; G06F 3/048; G06F 3/04842
See application file for complete search history.

(56) References Cited

U.S. PATENT DOCUMENTS 6,530,527 B1 *  3/2003  Ahlers .................... G07D 7/128
                                                              235/491
6,786,954 B1 *  9/2004  Lee ........................... B41M 3/14
                                                              106/31.13
(Continued)

FOREIGN PATENT DOCUMENTS

EP    1475242 A1    11/2004
EP    1873616 A2     1/2008
(Continued)

OTHER PUBLICATIONS

PCT International Search Report and Written Opinion dated Dec. 17, 2018 from corresponding Application No. PCT/FR2018/051838, with English translation of ISR, 12 pages.
(Continued)

*Primary Examiner* — Yosef Kassa
(74) *Attorney, Agent, or Firm* — Ware, Fressola, Maguire & Barber LLP

(57) ABSTRACT

The method comprises the steps: of applying the identifier (100') on an object; of making a first digital image and, subsequently, a second digital image of the identifier; of deriving first and second digital keys from the first and second images, respectively; and of comparing the second digital key with the first digital key; wherein the identifier (100') is made up of same-diameter microbeads (120) distributed in a random manner on the surface of the object, the microbeads being embedded in a layer (110') of binder, and deriving the first digital key comprises the steps of applying elliptical regression to a distribution of points representative of the positions of the microbeads in the first image in order to define an ellipse, and of applying a change of reference frame consisting in expressing the positions of said points in a reference frame based on the ellipse.

16 Claims, 4 Drawing Sheets

(56) References Cited

U.S. PATENT DOCUMENTS

| | | | | |
|---|---|---|---|---|
| 6,850,252 | B1 * | 2/2005 | Hoffberg | G06K 9/00369 |
| | | | | 348/E7.061 |
| 7,006,993 | B1 * | 2/2006 | Cheong | G06Q 20/02 |
| | | | | 705/35 |
| 7,067,824 | B2 * | 6/2006 | Muller | G06K 19/14 |
| | | | | 250/458.1 |
| 7,845,570 | B2 * | 12/2010 | Schwenk | G07D 7/0043 |
| | | | | 235/494 |
| 8,263,948 | B2 * | 9/2012 | Rapoport | G07D 7/1205 |
| | | | | 250/459.1 |
| 2006/0268259 | A1 | 11/2006 | Park | |

FOREIGN PATENT DOCUMENTS

| | | |
|---|---|---|
| EP | 2849118 A1 | 3/2015 |
| WO | 2006/042913 A1 | 4/2006 |

OTHER PUBLICATIONS

French Search Report dated May 11, 2018 from corresponding Application No. FR 1756908, 1 page.

* cited by examiner

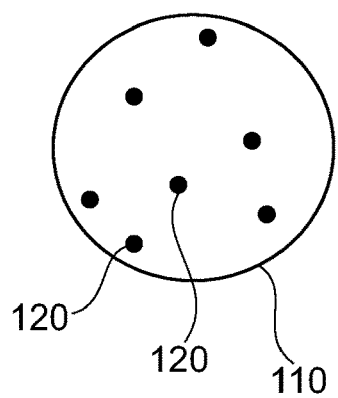
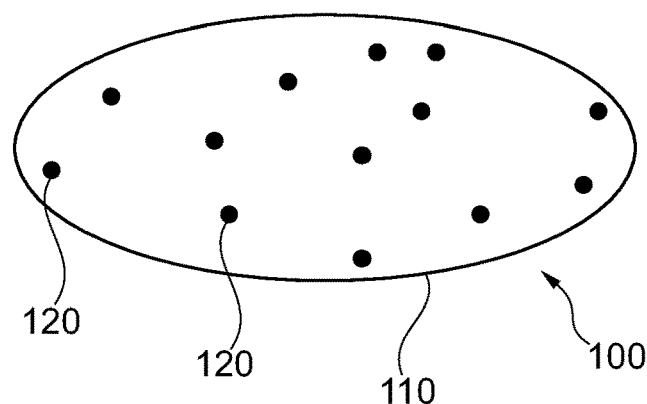
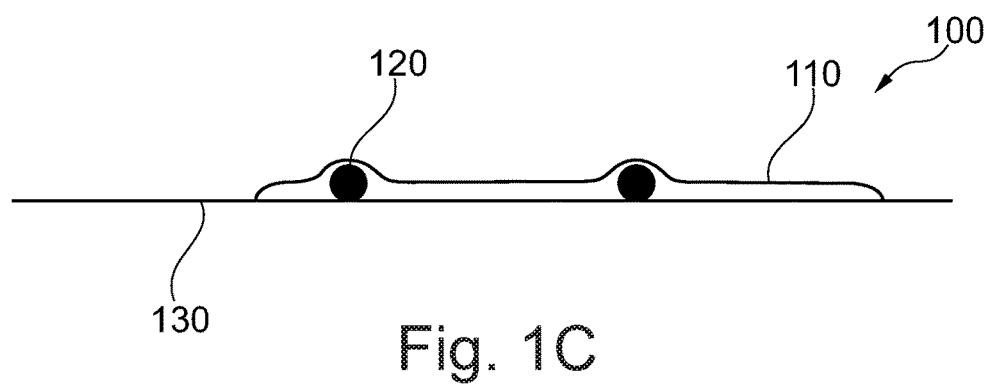
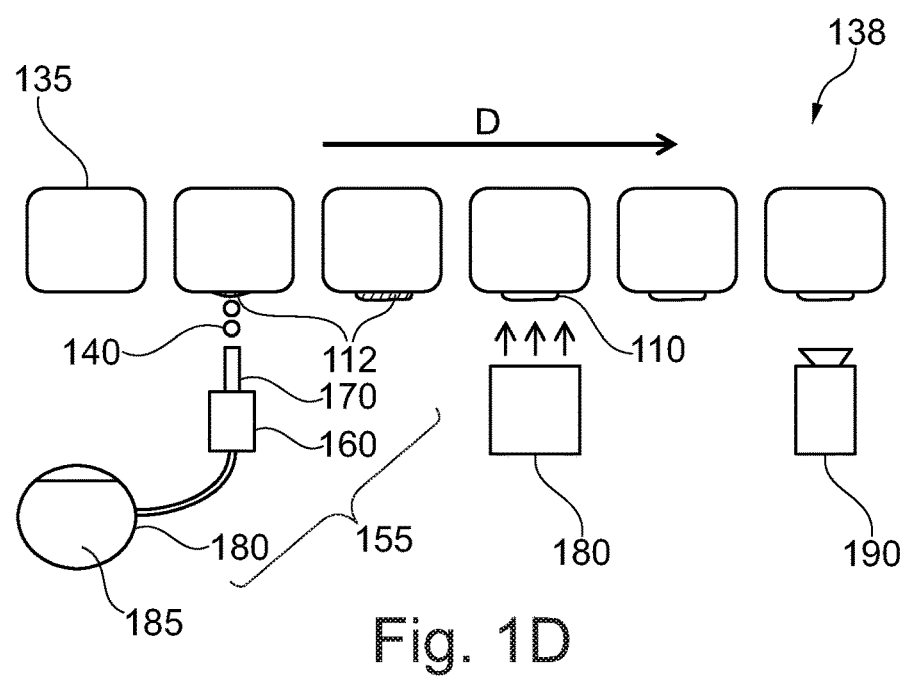

OPTICAL AUTHENTICATION METHOD

CROSS REFERENCE TO RELATED APPLICATIONS

This application is the U.S. National Stage of International Application No. PCT/FR2018/051838 filed on Jul. 19, 2018, which application claims priority under 35 USC § 119 to French Patent Application No. 1756908 filed on Jul. 21, 2017. Both applications are hereby incorporated by reference in their entirety.

TECHNICAL FIELD

The field of the invention is that of combating infringement and methods of identifying objects by means of identifiers applied to the objects.

PRIOR ART

Such an authentication method is known from patent Document WO2006/042913.

That authentication method provides a solution for authenticating objects by (1) forming an image of a mark made on each object that is to be identified, specifically a bubble identifier, (2) calculating a digital key for the image, and (3) comparing the digital key of the image with digital keys stored in advance in a remote database and derived from digital images made under predefined conditions in a manufacturing line for producing objects that are to be identified.

The characteristics of a digital image of an object depend naturally on the conditions under which the image is taken, such as the type of optical system used for making the image, and also its distance and angular position relative to the object. A digital key derived from the image depends strongly on these parameters, and ends up characterizing as much the conditions under which the image itself was taken as the object shown in the image. Consequently, making use of digital keys for two different images of the same object in order to identify said object remains a major challenge.

Ideally, an optical authentication system must make it possible to derive a digital key that is unique and invariant from two different images of the same identifier, and for this to apply in spite of differences and unknowns concerning the conditions under which the two images were taken and also concerning the equipment used. This applies in particular when an image is formed by an end user, having no special equipment or training.

Patent Documents EP 2 849 118, US 2006/0268259, EP 1 475 242, and EP 1 873 616 disclose methods involving analyzing images of an identifier that comprises elements that form patterns on which the authentication of a product relies, however those methods are complicated and/or based on identifiers that are sophisticated.

SUMMARY OF THE INVENTION

An object of the invention is to remedy those drawbacks.

An optical identification method of the invention relies on using an identifier of structure that is extremely simple to apply on the object that is to be identified, the identifier comprising same-diameter microbeads distributed in a random pattern on a surface of the object that is to be authenticated.

In particular, the authentication method of the invention for authenticating objects uses an identifier that is applied to each object and it comprises the following steps:

applying the identifier on an object that is to be authenticated;

making a first digital image of the identifier applied to the object;

deriving a first digital key from the first digital image;

storing the first digital key in a database containing a plurality of first digital keys;

subsequently, making a second digital image of the identifier applied to the object;

deriving a second digital key from the second image; and comparing the second digital key with the first digital keys stored in the database in order to detect a match, and in response to detecting a match, identifying the object as being authentic;

wherein, for the identifier that is applied to an object, use is made of same-diameter microbeads distributed in a random manner on the surface of the object, the microbeads being embedded in a layer of binder sprayed onto the surface of the object; and wherein the derivation of the first digital key from the first image comprises the following steps:

applying an elliptical regression to a distribution of points, each situated at the location of a respective one of the microbeads in the first image, in order to define an ellipse; and applying a change of reference frame consisting in expressing the coordinates of each point of the distribution in a reference frame based on the ellipse.

An advantage of the method of the invention lies in the fact that regardless of the angle and the distance from which the picture is taken, the microbeads are seen as disks or as circles. It is thus easy to identify them in a digital image of the identifier and to determine the pattern that they form. Furthermore, since the microbeads have the same diameter, it is possible, by using their apparent diameters in the image, to perform relatively simple digital processing for the purpose of describing their distribution independently of their coordinates in a reference frame associated with the image by establishing a reference frame that is specific to the pattern formed by the microbeads. In other words, the pattern formed by the microbeads may be characterized independently of the conditions under which the picture was taken.

Such an authentication method of the invention is sufficiently robust to identify reliably the authenticity of an object having an identifier applied thereon, and this can be done by an end user without any special knowledge and without any equipment dedicated for this purpose.

Unlike other techniques, this identification method does not require association with a predetermined identification code that is associated with an authentication mark. The identifier of the invention can be sufficient in itself, which provides great flexibility in use and simplifies the entire application process, from application the identifier and management of the identification service by a provider to use by an end user.

Furthermore, this method lends itself well to mass production and use of objects. It is easy to adapt the method to a variety of applications, e.g. merely by acting on the size of the identifier itself and/or on the diameter and the number of microbeads.

The authentication method of the invention may also present the following features:

the derivation of the second digital key from the second image may comprise the steps of:

applying an attitude correction step to a distribution of points, each situated at the location of a respective one of the microbeads in the second image, so as to reconstitute an image of the identifier as seen looking along a direction perpendicular to the surface on which the identifier is formed;

applying an elliptical regression to the distribution of points, each corresponding to a respective one of the microbeads in the second image that has been subjected to the attitude correction, in order to define an ellipse; and applying a change of reference frame consisting in expressing the coordinates of each point of the distribution in a reference frame based on the ellipse;

the method may include a step of normalizing the coordinates of the points of the distribution in the reference frame based on the ellipse by multiplying by a scale factor equal to the ratio of the real diameter of the microbeads divided by the mean diameter of the microbeads as seen in the image;

a circular regression may be applied to the images of the microbeads visible in the first digital image and/or the second digital image;

use may be made both of microbeads of a first brightness and/or of a first hue and also of microbeads of a second brightness and/or of a second hue that are respectively different from the first brightness and/or the first hue, so that at least some of the microbeads present sufficient visual contrast with the surface of the object for them to be identified automatically from the digital images;

the binder may be sprayed onto the surface of the object so as to be inscribed in a circle of diameter less than or equal to 15 millimeters (mm);

the binder may be sprayed onto the surface of the object so as to be inscribed in an ellipse of eccentricity greater than or equal to 1.5 and of major axis less than or equal to 15 mm;

it is possible to use authentication mark that comprises 10 to 100 microbeads, each having a diameter lying in the range 20 micrometers (μm) to 150 μm;

the second image may be made using a smartphone having a camera and a data processor unit, and the second digital key may be derived from the second digital image by means of said data processor unit of the smartphone and/or by means of a remote data processor unit.

BRIEF SUMMARY OF THE DRAWINGS

The present invention can be better understood and other advantages appear on reading the following detailed description of an implementation made by way of non-limiting example and illustrated by the accompanying drawings, in which:

FIGS. 1A and 1B show respective plan views of an identifier of the invention;

FIG. 1C shows a section view of the FIG. 1A identifier;

FIG. 1D shows a line for marking objects that are to be authenticated by using the identifier of FIG. 1A or 1B;

DESCRIPTION OF AN IMPLEMENTATION OF THE INVENTION

Figure 2A:
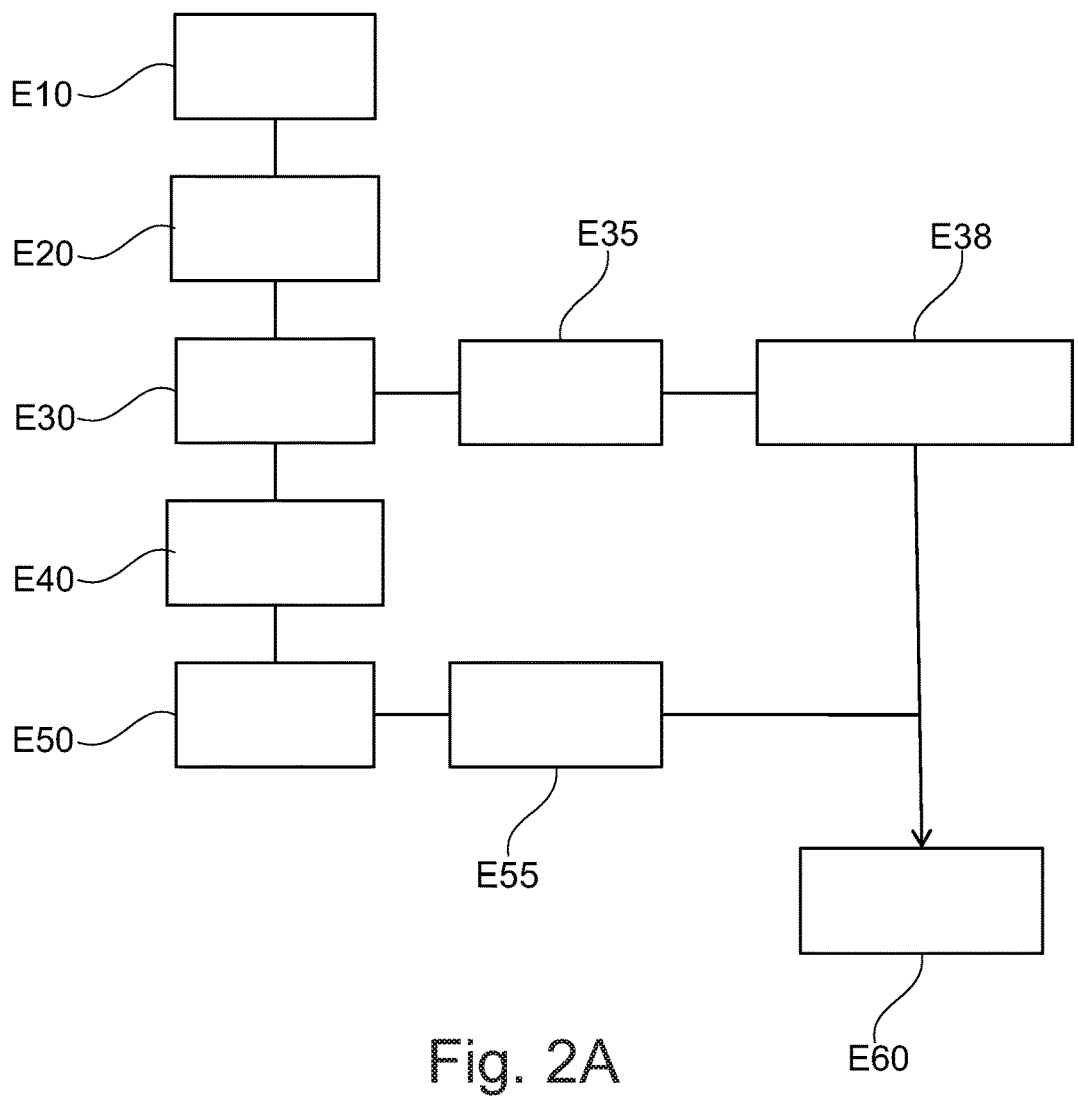
FIG. 2A shows an authentication method using the authentication mark of FIG. 1A or 1B.
Figure 2B:
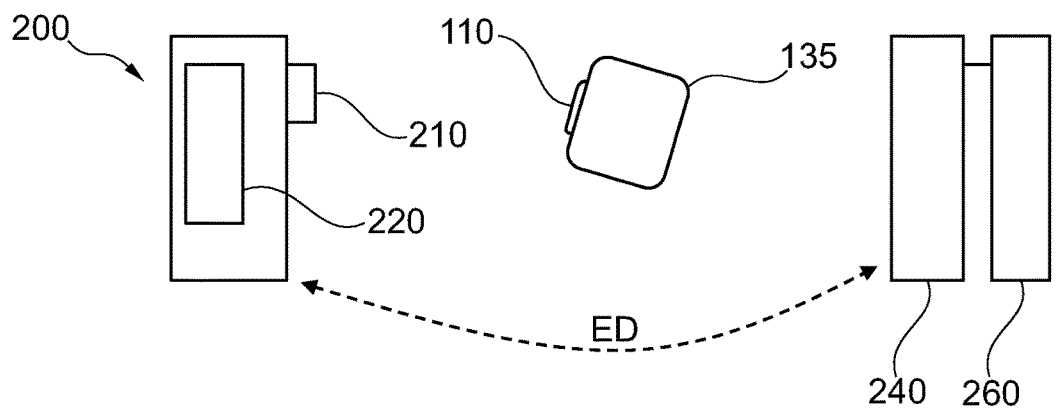
FIG. 2B shows a digital image being made of the identifier of FIG. 1A or 1B.
Figure 3:
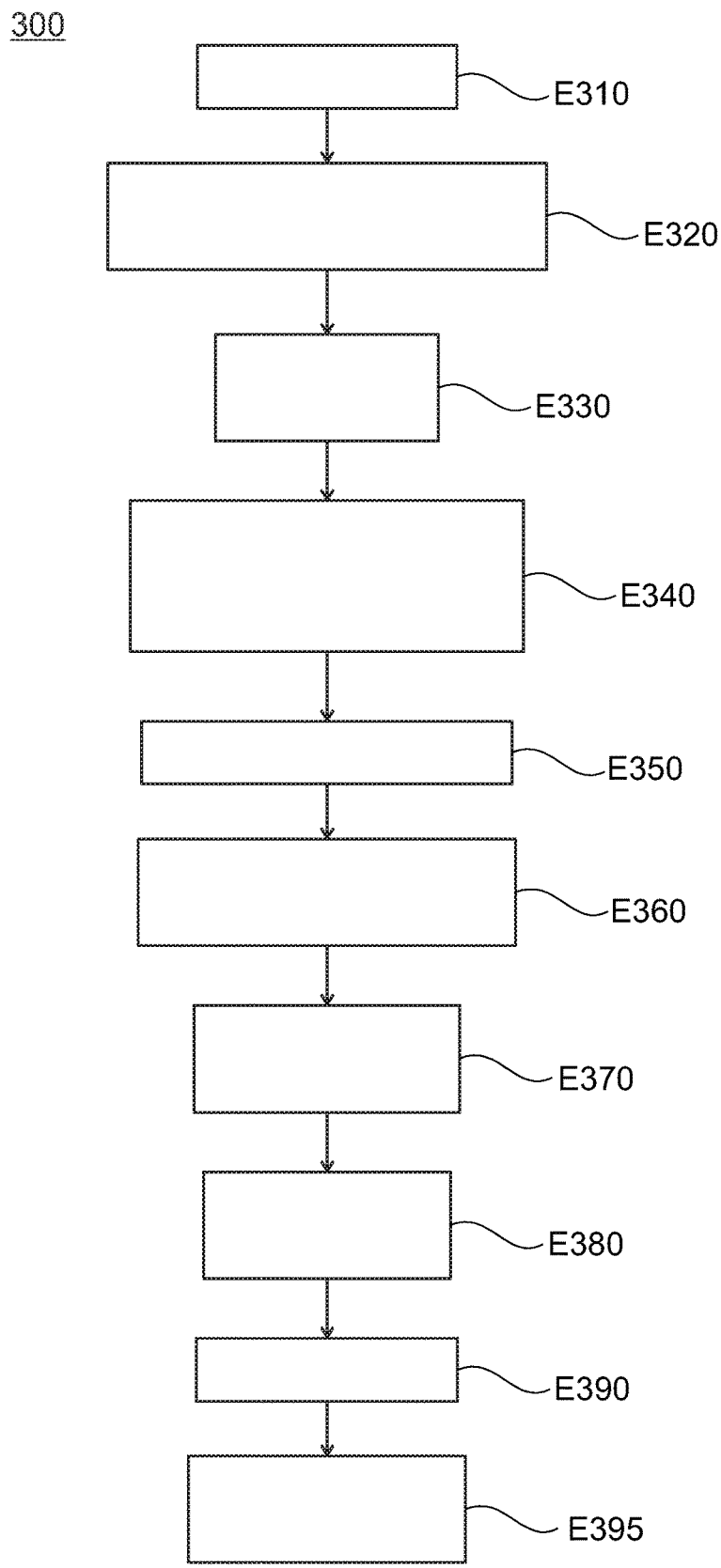
FIG. 3 shows digital processing of an image representing the identifier of FIG. 1A or 1B.

An authentication method of the invention is shown in FIGS. 2A and 2B.

The first step E10 consists in providing an object that is to be authenticated, e.g. in a stage of producing objects such as wine bottles or identification labels. During the step E20, and identifier 100 is applied to the surface of the object. It should be observed that since the identifier is itself to be used for generating a digital identification key, there is no need to provide an identification code that is associated with the identifier. After the identifier has been applied, a first digital image of the identifier is made during a step E30, and then a first digital key is derived from the first image during a step E35. This key is stored in a database 240 storing a plurality of first digital keys during a step E38.

Subsequently, the object is transferred to a user in a step E40. The user performs a portion of the authentication method by making a second digital image of the identifier during a step E50 by means of a picture-taking device. The picture-taking device may be a smartphone 200 having a camera 210 and a data processor unit 220.

A second digital key is derived from the second image during a step E55. By way of example, the necessary calculation operations may be performed by the data processor unit 220 of the smartphone 200.

During a step E60, the second digital key is compared with one or more first digital keys of the database 240 in order to detect a match.

While performing the steps E50, E55, and E60, the user may be remote from the database and, for comparison purposes, the smartphone 200 may send the second digital key to the database via a data exchange network ED, such as the Internet, for example. Alternatively, the second digital image may be sent as such to the database 240 and/or may be processed digitally by a remote data processor unit 260 connected to the database 240 in order to derive the second digital key. Another alternative is to perform pre-processing of the image at the user end by means of the data processor unit 220 of the smartphone, e.g. consisting in cleaning the image by eliminating noise, converting it to black and white, adjusting contrast, or indeed compressing it, and then sending the pre-processed image to the remote data processor unit 260 in order to finish off the operation of generating the second digital key and in order to compare it with one or more first digital keys in the database 240.

In response to detecting a match in the database, the object is identified as being an authentic object and an authenticity confirmation message can be sent to the smartphone 200.

The identifier, its application on objects to be authenticated, and the making of the first digital image are shown in FIGS. 1A to 1D.

An identifier 100 has a layer 110 of binder applied to a surface 130 of an object 135 that is to be authenticated. The layer 110 includes same-diameter microbeads 120 distributed in random manner over the surface 130.

It should be observed that the term "same-diameter" should be assessed with reference to the intended application and the associated specifications. The important point is that the diameter and the sphericity of the microbeads are sufficiently uniform for it to be possible to perform the method of determining the digital keys. It is possible to use microbeads from the manufacturer Cospheric, e.g. spheres of poly(methyl methacrylate), or "PMMA", guaranteed to have 90% of their diameters in the range 45 µm to 47 µm and sphericity of greater than 99%.

A layer 110 of binder, as shown in FIG. 1A, may form a disk. Preferably, the layer of binder has a shape that is elongate, such as an ellipse, as illustrated by the layer 110' of the identifier 100' shown in FIG. 1B. An elongate shape for the layer 110 greatly enhances the robustness of the identification method by making it easier to determine a reference frame that is specific to the image formed by the microbeads, and thus easier to determine digital keys.

As shown in FIG. 1D, an object 135 that is to be authenticated by the identifier 100 or the identifier 100' is marked by spraying onto the surface 130 of the object 135 that is to be authenticated one or more drops 140 of a hardenable liquid binder 185, such as a polymerizable liquid that contains microbeads 120.

Marking is performed in a marking line 138 in which a plurality of objects 135 that are to be authenticated travel along the line 138 in the direction D, and are marked in succession.

The hardenable binder 185 is sprayed by a spray system 155 making use of an ejector system 160 having a nozzle 170 and connected to a tank 180 containing the hardenable binder 185 that has the microbeads 126 mixed therein.

The drop(s) 140 spread(s) on the surface 130 of the object 135 that is to be authenticated, and form(s) a liquid thin film 112 in which the microbeads 120 are distributed in a random pattern.

When the hardenable binder is a polymerizable liquid, the marking is finished off by hardening the liquid thin film 112 by means of a polymerizer 180, thereby forming the layer 110 of binder and permanently setting a distribution of microbeads 120 in a distribution that is unique and that cannot be predicted.

By using a nozzle that is asymmetrical or by moving the nozzle relative to the object that is to be authenticated during spraying, it is possible to impart an elongate shape the layer 110.

A particular, but nonlimiting example is that of using a photopolymer as the hardenable binder 185. The polymerizer 180 is then a source of light, preferably of ultraviolet light.

The hardenable binder 185 may also be a paint or a varnish, and the polymerizer 180 may be a source of heat or of infrared radiation. It is preferable for the binder to have a hardening time that is short, so as to avoid slowing down the production line or complicating the method.

As shown in FIG. 1D, the marking line 158 includes a picture-taking appliance 190 for making a first image of the physical signature (100) on exiting the line.

Making a layer of binder that is elongate, as shown in FIG. 1B (110B), can contribute to facilitating the creation of a reference frame specific to the identifier, in a manner that is described in detail below.

The microbeads may be microbeads that are transparent or opaque, colored, or colorless, the essential point being to maintain good visual contrast relative to the surface of the object on which the microbeads are deposited. The term "good visual contrast" is used to mean that presently-available automatic digital image processor means are capable of identifying the microbeads as disks or circles in the digital images of the identifier.

In order to counter problems of visual contrast, it is also possible to make use of brightnesses and/or hues that are different from one another. For example, with a surface that presents a black-and-white pattern, using both white microbeads and black microbeads in combination makes it possible to guarantee that at least some of the microbeads remain clearly visible. In other words, at least some of the microbeads present good visual contrast relative to the surface of the object on which they are dispersed.

The microbeads may present a diameter such that presently-available picture-taking appliances are capable of imaging the microbeads with sufficient resolution, in other words of imaging them in the form of disks or circles. In the invention, appropriate microbead diameters may lie in the range of 20 µm to 150 µm.

The layer of binder may be designed to be inscribed in a circle having a diameter of 15 mm, preferably in a disk having a diameter of 10 mm, and more preferably in a disk having a diameter of 7 mm. Alternatively, the layer of binder may be inscribed in an ellipse having eccentricity greater than or equal to 1.5, with a major axis less than or equal to 15 mm, preferably 10 mm, and more preferably 7 mm. The layer of binder may also be transparent. These characteristics, singly or in combination, have the advantage of leading to marking that is discreet and that does not significantly degrade the external appearance of the object that is to be authenticated.

The number and the size of the microbeads 120 may be optimized as a function of the size of the layer 110 in which they are included, for the purposes (1) of enabling the possible number of configurations to be sufficient so that in practice each distribution of microbeads in an identifier is unique, and (2) of keeping the probability of obtaining clusters (bunches of microbeads in contact one another) below a limit that is acceptable given the constraints of the intended application. For binder layers 110 extending over a straight line segment having a length greater than 3 mm and inscribed in a circle having a diameter of 15 mm, it is considered as being acceptable for authentication mark to have a number of microbeads lying in the range 10 to 100, preferably 20 to 100, the microbeads being of diameter lying in the range 20 µm to 150 µm, and preferably in the range 30 µm to 70 µm. The probability of finding one or more clusters in the layer 110 is preferably kept below 10%, and more preferably below 5%. The mean number of microbeads in an identifier can be adjusted by acting on the density of microbeads 120 present in the polymerizable liquid 185.

Digital processing 300 suitable for application to the first image and/or the second image is shown in FIGS. 3 and 4A to 4D. This digital processing 300, which terminates by generating a digital key, has the purpose of obtaining digital keys that are identical from different images of the same identifier.

After a digital image of the identifier 100 has been formed in a step E310, circular patterns 410 (circles or disks) are identified in the image during a step E320. These circular patterns correspond to the microbeads 120 of the identifier 100, and they are visible as circular shapes regardless of the distance or the angle from which the picture is taken, thus making them easily identifiable.

Alternatively, and in preference to detecting circular patterns in the digital image, it is assumed that the contrast spots visible in the image correspond to circles or to disks, thereby considerably simplifying the identification step E328. This assumption is increasingly realistic when the acceptable quantity of microbeads clusters is small. The advantage of this approach is to eliminate any need to search for circular shapes in the image, thereby greatly limiting the burden of calculation. Thus, each visible contrast spot, like each circular pattern, may correspond to one of the microbeads.

In order to be unaffected by pixelization effects, it is possible, during a step E330, to apply a circular regression to each of the circular patterns identified during the step E320. It is then possible to replace the originally-identified circular patterns 210 or contrast spots with calculated circular patterns 420. Applying this circular regression facilitates subsequent calculations and considerably improves their accuracy, in particular during an attitude correction step E350.

The diameters and/or the positions of the centers of the circular patterns or of the contrast spots, or of the calculated circular patterns, are determined during a step E340 and they may be expressed in a reference frame specific to the digital image. The positions of the centers correspond to points forming a distribution 430 of points. Generation of the digital key is based on this distribution 430 of points, each of which is situated at the center of the image of one of the microbeads in the digital image of the identifier. It should be observed that methods other than that described above can be applied, so long as a distribution is determined of points that are distributed in the same manner as the images of the microbeads, and preferably at their centers.

The digital processing may include an attitude correction step E350 for correcting the effects that the orientation of the picture-taking appliance can have on the digital image. This correction, which serves to reconstitute an image of the identifier as seen looking along a direction perpendicular to the surface on which it is formed, is made possible by knowing the real diameter of the microbeads. This step can be useful for correcting a digital image of the identifier that has been acquired while looking along a direction that departs from the perpendicular to the surface on which the identifier is formed by an amount that is too great for it to be possible to form a digital key that is invariant.

The correction may comprise determining two angles, $\theta$ and $\varphi$, that correspond respectively to first and second attitude differences of a photographic sensor of the picture-taking appliance used for making the digital image relative to first and second axes of that appliance, the second axis being perpendicular to the first axis. The first angle, written $\theta$, may be determined as follows. The first axis and the second axis of the sensor may correspond to two perpendicular edges of the digital image acquired by the picture-taking appliance.

The distance between the photographic sensor and the authentication mark is written D, and the focal length of the picture-taking appliance is written f. The diameter $\emptyset_{b\ image}$ of a microbead in the image is the product of multiplying the magnification by the real microbead diameter $\emptyset_b$, i.e.:

$$\emptyset_{b\ image} = \emptyset_b f/D$$

In the image plane of the picture-taking device, the diameter of a microbead k may be written as follows:

$$\emptyset_b^k \text{image} = \emptyset_b \frac{f}{D - l_k \tan\theta} = \emptyset_b \text{image} \frac{f}{1 - \frac{l_k}{D}\tan\theta}$$

Where $l_k$ is the distance from the microbead k to the first axis.

For a small angle $\theta$, this relationship can be simplified as follows:

$$\emptyset_b^k \text{image} = \emptyset_b \text{image}\left(1 + \frac{l_k}{D}\theta\right)$$

This relationship enables $\theta$ to be determined by a linear regression applied to a cloud of points having pairs of coordinates $(l_k; \emptyset_{b\ image}^k)$. Thereafter, the points of the distribution are rotated through an angle $\theta$ about the corresponding axis using well-known methods. On the same principle, $\varphi$ is determined and rotation through the angle $\varphi$ is applied to the points of the distribution. After these two rotations, all of the microbeads should have the same apparent diameter in the image.

The purpose of steps E360, E370, and E380 is to generate a reference frame specific to the distribution 430. To do this, an elliptical regression is applied in the step E360 to the points of the distribution, whether or not they have been subjected to the attitude correction, thereby defining the ellipse 440 that is the best fit for the set of points of the distribution.

Figure 4A:
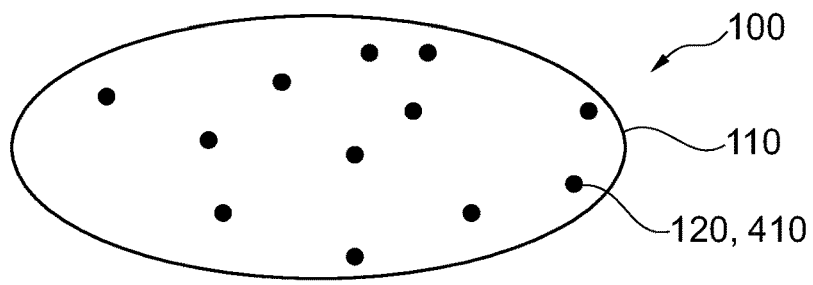
FIGS. 4A to 4D show steps in the digital processing of FIG. 3.
Figure 4B:
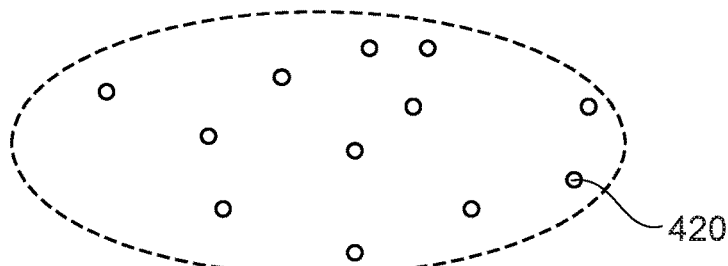
Figure 4C:
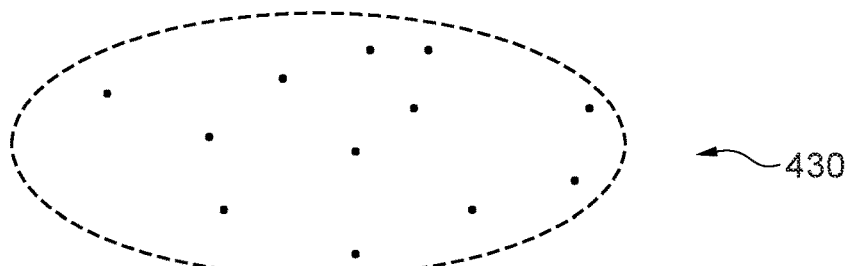
Figure 4D:
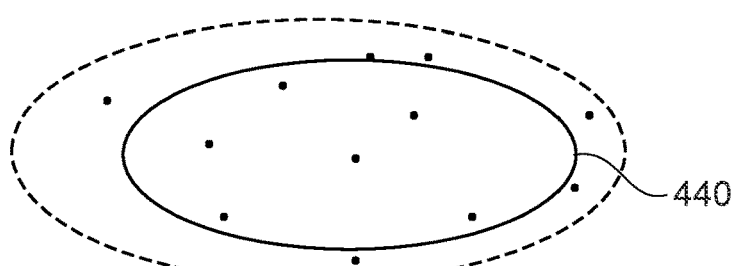

It should be observed that although a distribution of points set in a generally elongate layer 110' of binder, as shown in FIG. 4A, is favorable for generating the reference frame, it remains possible to use a generally circular layer 110, as shown in FIG. 1A.

The step E370 consists in determining the center of the ellipse, its major axis, its minor axis, and the angle of the major axis in the reference frame of the initial digital image. The center of the ellipse, its major axis, and its minor axis may serve respectively to define the center, the abscissa axis, and the ordinate axis of a new reference frame, specific to the distribution of points.

The coordinates of each point of the distribution are expressed in the reference frame based on the ellipse 440 during the step E380 for changing reference frame. After this change of reference frame, the points of the distribution have coordinates that are expressed in a reference frame that is linked purely to the distribution itself, and that is not linked to the digital image, as applies prior to this step.

A step E390 consists in normalizing the contents of the points of the distribution by multiplying by a scale factor equal to the ratio of the real diameter of the microbeads divided by a mean diameter for the circular shapes calculated in the image, i.e. divided by the mean diameter of the microbeads as seen in the image.

This step makes generating the digital key independent of the angle of field of the optical device used for making the image and/or independent of the distance between the center of the optical device and the authentication mark while acquiring the image, and thus facilitates generating a digital key that is invariant.

Using an image of the authentication mark 100 as described above and after the digital processing of steps E322 to E390, a digital key that is independent of picture-taking conditions can be generated during a step E395 for generating a digital key.

It should be observed that there is no need to apply all of the above-described digital processing steps on each occasion. For example, the attitude correcting step E350 applies particularly to the situation of a user making a handheld image of the authentication mark under conditions that are poorly controlled, in particular concerning the picture-taking angle. Under such circumstances, it is likely that attitude correction is necessary. In contrast, under factory conditions, the orientation of the picture-taking device can be controlled so as to make the attitude correction step superfluous.

What is claimed is:

1. An authentication method for authenticating objects by using an identifier that is applied to each object, the method comprising the following steps:

applying the identifier on an object that is to be authenticated;
making a first digital image of the identifier applied to the object;
deriving a first digital key from the first digital image;
storing the first digital key in a database containing a plurality of first digital keys;
subsequently, making a second digital image of the identifier applied to the object;
deriving a second digital key from the second image; and
comparing the second digital key with the first digital keys stored in the database in order to detect a match, and in response to detecting a match, identifying the object as being authentic;
wherein, for the identifier that is applied to an object, use is made of same-diameter microbeads distributed in a random manner on the surface of the object, the microbeads being embedded in a layer of binder sprayed onto the surface of the object; and
wherein the derivation of the first digital key from the first image comprises the following steps:
applying an elliptical regression to a distribution of points, each situated at the location of a respective one of the microbeads in the first image, in order to define an ellipse; and
applying a change of reference frame consisting in expressing the coordinates of each point of the distribution in a reference frame based on the ellipse.

2. The authentication method according to claim 1, wherein the derivation of the second digital key from the second image comprises the steps of:
applying an attitude correction step to a distribution of points, each situated at the location of a respective one of the microbeads in the second image, so as to reconstitute an image of the identifier as seen looking along a direction perpendicular to the surface on which the identifier is formed;
applying an elliptical regression to the distribution of points, each corresponding to a respective one of the microbeads in the second image that has been subjected to the attitude correction, in order to define an ellipse; and
applying a change of reference frame consisting in expressing the coordinates of each point of the distribution in a reference frame based on the ellipse.

3. The authentication method according to claim 2, wherein the method includes a step of normalizing the coordinates of the points of the distribution in the reference frame based on the ellipse by multiplying by a scale factor equal to the ratio of the real diameter of the microbeads divided by the mean diameter of the microbeads as seen in the image.

4. The authentication method according to claim 3, wherein a circular regression is applied to the images of the microbeads visible in the first digital image and/or the second digital image.

5. The authentication method according to claim 4, wherein use is made both of microbeads of a first brightness and/or of a first hue and also of microbeads of a second brightness and/or of a second hue that are respectively different from the first brightness and/or the first hue, so that at least some of the microbeads present sufficient visual contrast with the surface of the object for them to be identified automatically from the digital images.

6. The authentication method according to claim 5, wherein the binder is sprayed onto the surface of the object so as to be inscribed in a circle of diameter less than or equal to 15 mm.

7. The authentication method according to claim 5, wherein the binder is sprayed onto the surface of the object so as to be inscribed in an ellipse of eccentricity greater than or equal to 1.5 and of major axis less than or equal to 15 mm.

8. The authentication method according to claim 5, wherein an identifier is used that comprises a number of microbeads lying in the range 10 to 100, each having a diameter lying in the range 20 µm to 150 µm.

9. The authentication method according to claim 8, wherein the second image is made using a smartphone having a camera and a data processor unit, and in that the second digital key is derived from the second digital image by means of said data processor unit of the smartphone and/or by means of a remote data processor unit.

10. The authentication method according to claim 1, wherein the method includes a step of normalizing the coordinates of the points of the distribution in the reference frame based on the ellipse by multiplying by a scale factor equal to the ratio of the real diameter of the microbeads divided by the mean diameter of the microbeads as seen in the image.

11. The authentication method according to claim 4, wherein a circular regression is applied to the images of the microbeads visible in the first digital image and/or the second digital image.

12. The authentication method according to claim 1, wherein use is made both of microbeads of a first brightness and/or of a first hue and also of microbeads of a second brightness and/or of a second hue that are respectively different from the first brightness and/or the first hue, so that at least some of the microbeads present sufficient visual contrast with the surface of the object for them to be identified automatically from the digital images.

13. The authentication method according to claim 1, wherein the binder is sprayed onto the surface of the object so as to be inscribed in a circle of diameter less than or equal to 15 mm.

14. The authentication method according to claim 1, wherein the binder is sprayed onto the surface of the object so as to be inscribed in an ellipse of eccentricity greater than or equal to 1.5 and of major axis less than or equal to 15 mm.

15. The authentication method according to claim 1, wherein an identifier is used that comprises a number of microbeads lying in the range 10 to 100, each having a diameter lying in the range 20 µm to 150 µm.

16. The authentication method according to claim 1, wherein the second image is made using a smartphone having a camera and a data processor unit, and in that the second digital key is derived from the second digital image by means of said data processor unit of the smartphone and/or by means of a remote data processor unit.

* * * * *